United States Patent
Lee et al.

(10) Patent No.: US 10,615,941 B2
(45) Date of Patent: Apr. 7, 2020

(54) METHOD FOR REPORTING CHANNEL STATE IN WIRELESS COMMUNICATION SYSTEM, AND DEVICE THEREFOR

(71) Applicant: LG ELECTRONICS INC., Seoul (KR)

(72) Inventors: Hyunho Lee, Seoul (KR); Daesung Hwang, Seoul (KR); Suckchel Yang, Seoul (KR)

(73) Assignee: LG Electronics Inc., Seoul (KR)

(*) Notice: Subject to any disclaimer, the term of this patent is extended or adjusted under 35 U.S.C. 154(b) by 67 days.

(21) Appl. No.: 15/743,570

(22) PCT Filed: Sep. 13, 2016

(86) PCT No.: PCT/KR2016/010344
§ 371 (c)(1),
(2) Date: Jan. 10, 2018

(87) PCT Pub. No.: WO2017/048057
PCT Pub. Date: Mar. 23, 2017

(65) Prior Publication Data
US 2018/0198590 A1    Jul. 12, 2018

Related U.S. Application Data

(60) Provisional application No. 62/221,089, filed on Sep. 20, 2015.

(51) Int. Cl.
*H04L 5/00* (2006.01)
*H04L 1/16* (2006.01)
(Continued)

(52) U.S. Cl.
CPC ........... *H04L 5/0057* (2013.01); *H04B 17/24* (2015.01); *H04L 1/0073* (2013.01);
(Continued)

(58) Field of Classification Search
None
See application file for complete search history.

(56) References Cited

U.S. PATENT DOCUMENTS

2012/0264441 A1* 10/2012 Chandrasekhar ..... H04L 5/0096
455/450
2013/0051288 A1    2/2013 Yamada et al.
(Continued)

OTHER PUBLICATIONS

Magnus Proebster et al., "Context-aware resource allocation for cellular wireless networks", In: EURASIP Journal on Wireless Communications and Networking, Jul. 12, 2012, pp. 1-19.
(Continued)

*Primary Examiner* — Chirag G Shah
*Assistant Examiner* — Amarnauth G Persaud
(74) *Attorney, Agent, or Firm* — Dentons US LLP

(57) ABSTRACT

According to one embodiment of the present invention, a method for channel-coding channel state information (CSI) in a wireless communication system is performed by a terminal and comprises the steps of: determining the number of input bits for a channel encoder of multi-CSI, to be transmitted in one subframe, for a plurality of cells or CSI processes; and channel-coding input bits for the multi-CSI having the determined number of input bits, wherein the number of input bits of pieces of CSI determined for each individual CSI, for each CSI group, or for each physical uplink control channel (PUCCH) report type or PUCCH report mode.

12 Claims, 8 Drawing Sheets

(51) Int. Cl.
*H04L 1/00* (2006.01)
*H04B 17/24* (2015.01)
*H04B 7/06* (2006.01)
*H04W 24/10* (2009.01)

(52) U.S. Cl.
CPC .......... *H04L 1/1671* (2013.01); *H04B 7/0626* (2013.01); *H04B 7/0632* (2013.01); *H04L 1/0026* (2013.01); *H04W 24/10* (2013.01)

(56) References Cited

U.S. PATENT DOCUMENTS

| | | | | |
|---|---|---|---|---|
| 2013/0077595 A1* | 3/2013 | Aiba | ..................... | H04L 1/0041 370/329 |
| 2014/0003452 A1* | 1/2014 | Han | ..................... | H04L 1/1657 370/474 |
| 2014/0029533 A1* | 1/2014 | Han | .................. | H04W 72/0413 370/329 |
| 2014/0078974 A1* | 3/2014 | Falahati | ................ | H04L 5/0055 370/329 |
| 2014/0119284 A1* | 5/2014 | Baldemair | .............. | H04L 5/003 370/328 |
| 2014/0192717 A1 | 7/2014 | Liu et al. | | |
| 2015/0049698 A1* | 2/2015 | Liu | ....................... | H04L 5/0057 370/329 |
| 2016/0007350 A1* | 1/2016 | Xiong | ................... | H04W 24/10 370/252 |
| 2018/0103488 A1* | 4/2018 | Marinier | .............. | H04B 7/0639 |
| 2018/0184318 A1* | 6/2018 | Su | ........................ | H04B 7/0626 |
| 2018/0338339 A1* | 11/2018 | Song | ....................... | H04L 5/001 |
| 2019/0029014 A1* | 1/2019 | Golitschek Edler von Elbwart | ................ | H04W 24/10 |

OTHER PUBLICATIONS

Hatem Abou-Zeid et al., "Towards mobility-aware predictive radio access: modeling; simulation; and evaluation in LTE networks", In: Proceedings of the 17th ACM international conference on Modeling, analysis and simulation of wireless and mobile systems, Sep. 21, 2014, pp. 1-10.

NGMN Alliance, "NGMN 5G White Paper", Feb. 17, 2015, pp. 1-125.

* cited by examiner

METHOD FOR REPORTING CHANNEL STATE IN WIRELESS COMMUNICATION SYSTEM, AND DEVICE THEREFOR

This application is a 35 USC § 371 National Stage entry of International Application No. PCT/KR2016/010344 filed on Sep. 13, 2016, and claims priority to U.S. Provisional Application No. 62/221,089 filed on Sep. 20, 2015, all of which are hereby incorporated by reference in their entireties as if fully set forth herein.

TECHNICAL FIELD

The present invention relates to a wireless communication system, and more particularly, to a method of reporting a channel state in a wireless communication system and an apparatus therefor.

BACKGROUND ART

In a cellular communication system, a base station controls transmission and reception of data transceived with a plurality of user equipments and transmits scheduling information (e.g., time/frequency on which data is to be transmitted, MCS (modulation and coding scheme), HARQ (hybrid automatic retransmission request)-related information on downlink data transmitted to a user equipment) to the user equipment to enable the user equipment to receive data. Similarly, the base station informs the user equipment of uplink scheduling information to enable the user equipment to transmit uplink data. Recently, in order to support a wider bandwidth while utilizing a legacy band distinction, a CA (carrier aggregation) technology has been introduced to transmit downlink data to a single UE by aggregating unit CC (component carrier). In particular, LTE standard considers a self-CC scheduling technology that each cell transmits a control channel including scheduling information and a cross-CC scheduling technology that a cell transmits a control channel including scheduling information of a different cell in a situation that a plurality of CCs (component carriers) of a different duplex mode or the same duplex mode are aggregated. Although a current LTE standard considers CA that transmits downlink data by aggregating 5 CCs, recently, in order to support rapidly increasing traffic load, CA enhancement for transmitting downlink data by aggregating 5 or more CCs (e.g., 8, 16, 32 CCs) is considering. In this case, it is anticipated that the number of bits for UCI such as HARQ-ACK (acknowledgement), CSI (channel state information), and the like is to be rapidly increased. If an error occurs in performing transmission and detection, it may have a great ripple effect due to the error.

DISCLOSURE OF THE INVENTION

Technical Task

A technical task of the present invention is to propose a method of reporting a channel state in a wireless communication system and an operation therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method for performing channel coding on channel state information (CSI), which is performed by a terminal in a wireless communication system, includes determining a number of input bits for a channel encoder of multiple CSI for a plurality of cells or CSI processes to be transmitted in a subframe, and performing channel coding of input bits for the multiple CSI of the determined number of input bits. In this case, the number of input bits of the multiple CSI may correspond to the sum of input bits of CSIs which are determined per individual CSI, CSI group, or physical uplink control channel (PUCCH) reporting type or PUCCH reporting mode.

Additionally or alternatively, when the number of input bits for the channel encoder of the multiple CSI corresponds to the sum of the input bits of CSIs determined per individual CSI, an actual individual CSI bit can be padded with the predetermined number of bits only for a type of the individual CSI of which a bit width is changed according to a rank value of a downlink channel.

Additionally or alternatively, the number of input bits determined per individual CSI may be calculated by the maximum number of bits configured per type of CSI or the maximum number of bits configured according to the number of antenna ports of the individual CSI.

Additionally or alternatively, when the number of input bits for the channel encoder of the multiple CSI corresponds to the sum of the input bits of CSIs determined per CSI group, an actual individual CSI bit of the CSI group can be padded with the predetermined number of bits only for the CSI group including CSI of which a bit width is changed according to a rank value of a downlink channel.

Additionally or alternatively, when the number of input bits for the channel encoder of the multiple CSI corresponds to the sum of the input bits of CSIs determined per PUCCH reporting type or PUCCH reporting mode, the number of input bits for a first PUCCH reporting type or PUCCH reporting mode can be determined by a maximum bit width of a second PUCCH reporting type or PUCCH reporting mode determining a bit width of CSI of the first PUCCH reporting type or PUCCH reporting mode.

Additionally or alternatively, an input bit for the first PUCCH reporting type or PUCCH reporting mode can include an actual CSI bit for the first PUCCH reporting type or PUCCH reporting mode mapped to a predetermined position and a fixed bit mapped to the remaining position.

Additionally or alternatively, when the number of input bits for the channel encoder of the multiple CSI corresponds to the sum of the input bits of CSIs determined per PUCCH reporting type or PUCCH reporting mode, the number of input bits for the PUCCH reporting type or the PUCCH reporting mode can be calculated by the maximum number of bits configured per PUCCH reporting type or PUCCH reporting mode or the maximum number of bits configured according to the number of antenna ports of the individual CSI.

Additionally or alternatively, when the number of input bits for the channel encoder of the multiple CSI corresponds to the sum of the input bits of CSIs determined per PUCCH reporting type or PUCCH reporting mode, the method may further include receiving information on the number of input bits of the channel encoder configured per combination of the PUCCH reporting type and the PUCCH reporting mode.

Additionally or alternatively, when the number of input bits for the channel encoder of the multiple CSI corresponds to the sum of the input bits of CSIs determined per PUCCH reporting type or PUCCH reporting mode, the method may further include receiving information on the number of input bits of the channel encoder configured per combination of all or a part of the PUCCH reporting type, the PUCCH reporting mode, and the number of antenna ports.

Additionally or alternatively, bits for the coded multiple CSI may include a cyclic redundancy check (CRC) mask as an indicator indicating the number of actual CSI bits per a plurality of cells or CSI processes, per individual CSI, or per CSI group.

To further achieve these and other advantages and in accordance with the purpose of the present invention, according to a different embodiment, a terminal configured to perform channel coding on channel state information (CSI) in a wireless communication system includes a transmitter and a receiver, and a processor that controls the transmitter and the receiver, the processor determines a number of input bits for a channel encoder of multiple CSI for a plurality of cells or CSI processes to be transmitted in a subframe, performs channel coding of input bits for the multiple CSI of the determined number of input bits. In this case, the number of input bits of the multiple CSI may correspond to the sum of input bits of CSIs which are determined per individual CSI, CSI group, or per physical uplink control channel (PUCCH) reporting type or PUCCH reporting mode.

Additionally or alternatively, when the number of input bits for the channel encoder of the multiple CSI corresponds to the sum of the input bits of CSIs determined per individual CSI, an actual individual CSI bit can be padded with the predetermined number of bits only for a type of the individual CSI of which a bit width is changed according to a rank value of a downlink channel.

Additionally or alternatively, the number of input bits determined per individual CSI may be calculated by the maximum number of bits configured per type of CSI or the maximum number of bits configured according to the number of antenna ports of the individual CSI.

Additionally or alternatively, when the number of input bits for the channel encoder of the multiple CSI corresponds to the sum of the input bits of CSIs determined per CSI group, an actual individual CSI bit of the CSI group can be padded with the predetermined number of bits only for the CSI group including CSI of which a bit width is changed according to a rank value of a downlink channel.

Additionally or alternatively, when the number of input bits for the channel encoder of the multiple CSI corresponds to the sum of the input bits of CSIs determined per PUCCH reporting type or PUCCH reporting mode, the number of input bits for a first PUCCH reporting type or PUCCH reporting mode may be determined by a maximum bit width of a second PUCCH reporting type or PUCCH reporting mode determining a bit width of CSI of the first PUCCH reporting type or PUCCH reporting mode.

Additionally or alternatively, an input bit for the first PUCCH reporting type or PUCCH reporting mode may include an actual CSI bit for the first PUCCH reporting type or PUCCH reporting mode mapped to a predetermined position and a fixed bit mapped to the remaining position.

Additionally or alternatively, when the number of input bits for the channel encoder of the multiple CSI corresponds to the sum of the input bits of CSIs determined per PUCCH reporting type or PUCCH reporting mode, the number of input bits for the PUCCH reporting type or the PUCCH reporting mode may be calculated by the maximum number of bits configured per PUCCH reporting type or PUCCH reporting mode or the maximum number of bits configured according to the number of antenna ports of the individual CSI.

Additionally or alternatively, when the number of input bits for the channel encoder of the multiple CSI corresponds to the sum of the input bits of CSIs determined per PUCCH reporting type or PUCCH reporting mode, the processor may receive information on the number of input bits of the channel encoder per combination of the PUCCH reporting type and the PUCCH reporting mode.

Additionally or alternatively, if the number of input bits for the channel encoder of the multiple CSI corresponds to the sum of the input bits of CSIs determined per PUCCH reporting type or PUCCH reporting mode, the processor may receive information on the number of input bits of the channel encoder configured per combination of all or a part of the PUCCH reporting type, the PUCCH reporting mode, and the number of antenna ports.

Additionally or alternatively, bits for the coded multiple CSI may include a cyclic redundancy check (CRC) mask as an indicator indicating the number of actual CSI bits per a plurality of cells or CSI processes, per individual CSI, or per CSI group Technical solutions obtainable from the present invention are non-limited the above-mentioned technical solutions. And, other unmentioned technical solutions can be clearly understood from the following description by those having ordinary skill in the technical field to which the present invention pertains.

Advantageous Effects

According to one embodiment of the present invention, it is able to efficiently report a channel state in a wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Figure 1:
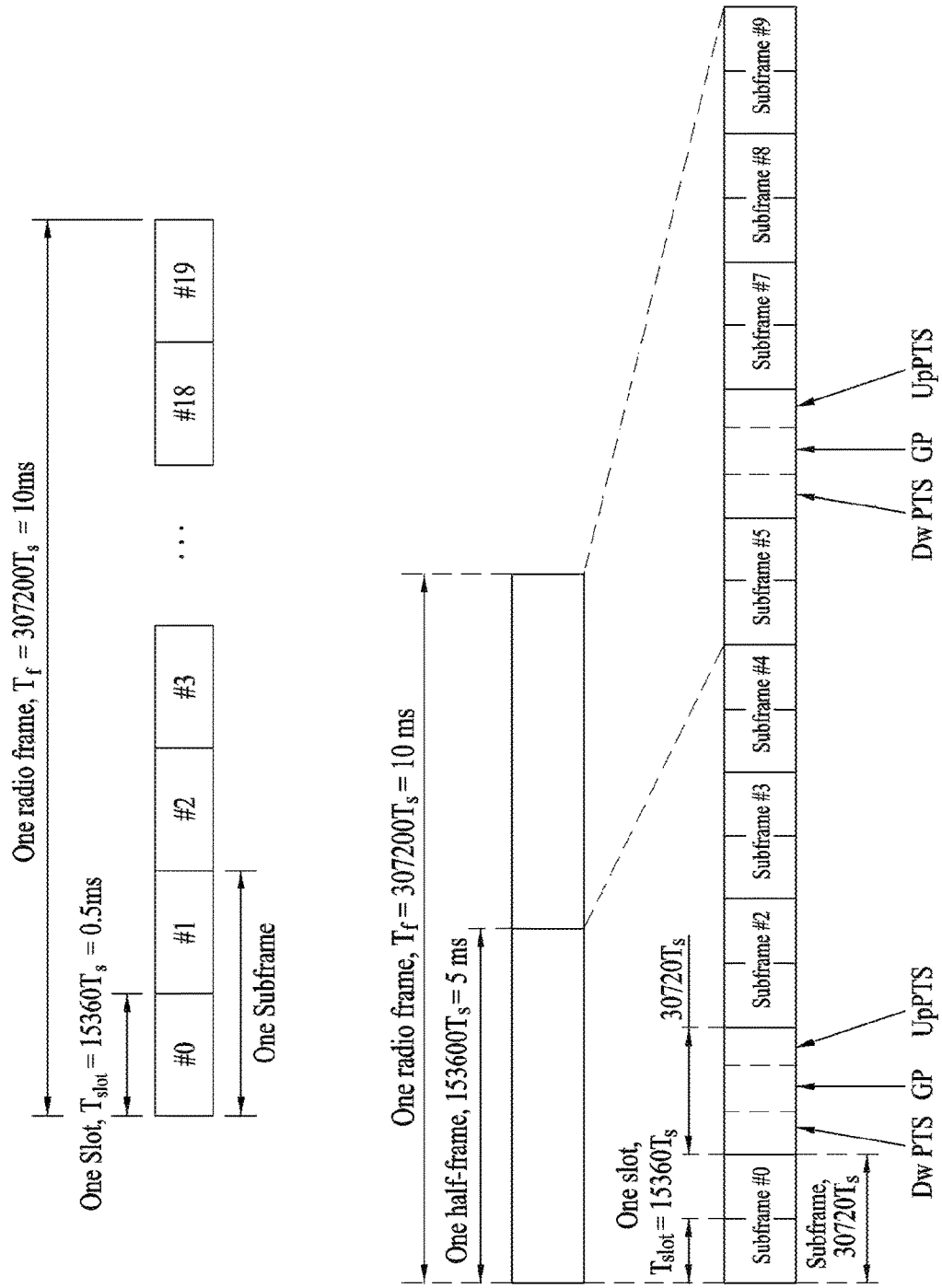
FIG. 1 is a diagram for an example of a radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlike a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |

TABLE 2-continued

| | | Normal cyclic prefix in downlink | | | Extended cyclic prefix in downlink | |
| --- | --- | --- | --- | --- | --- | --- |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Figure 2:
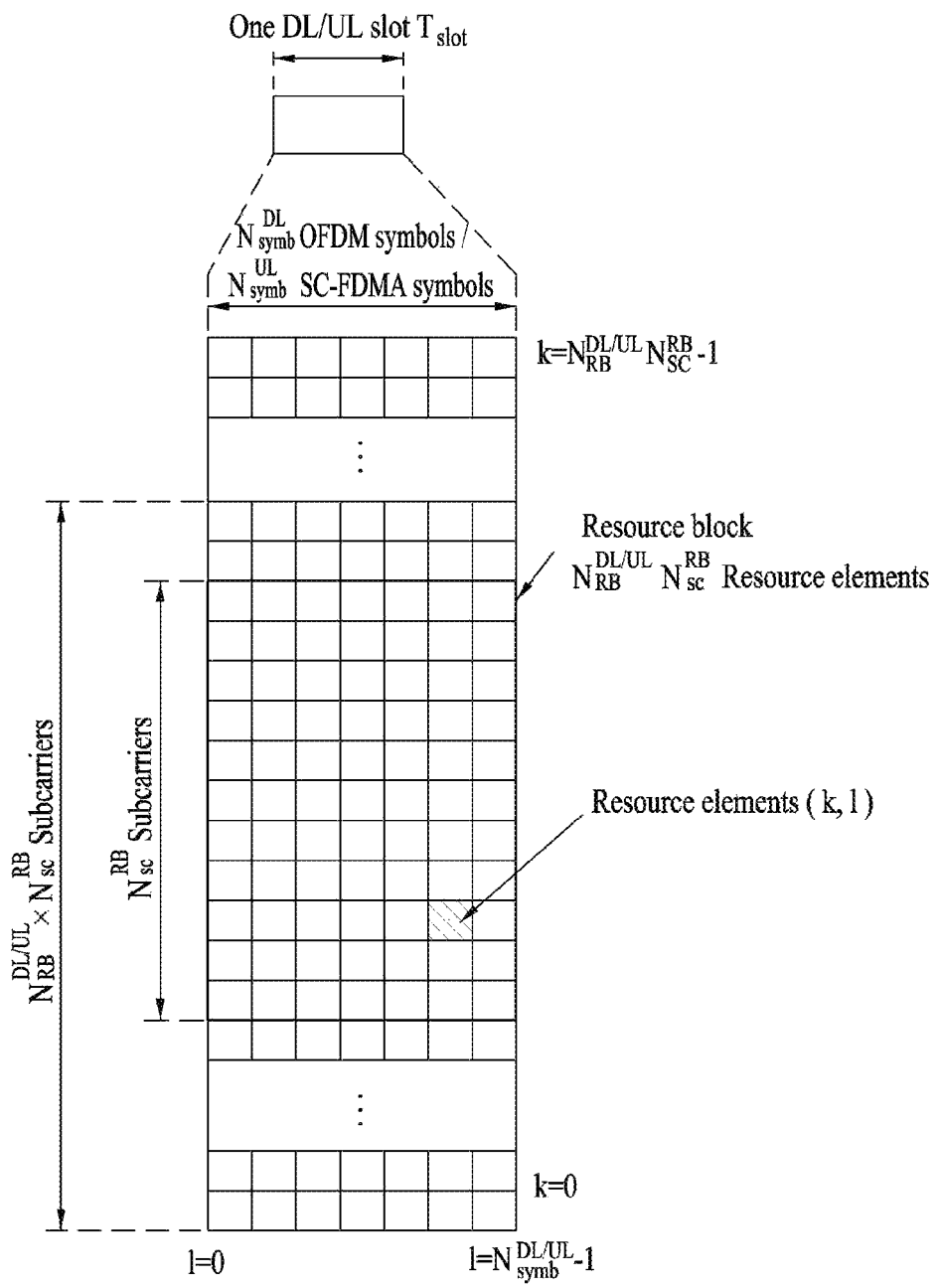
FIG. 2 is a diagram for an example of a downlink (DL)/uplink (UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
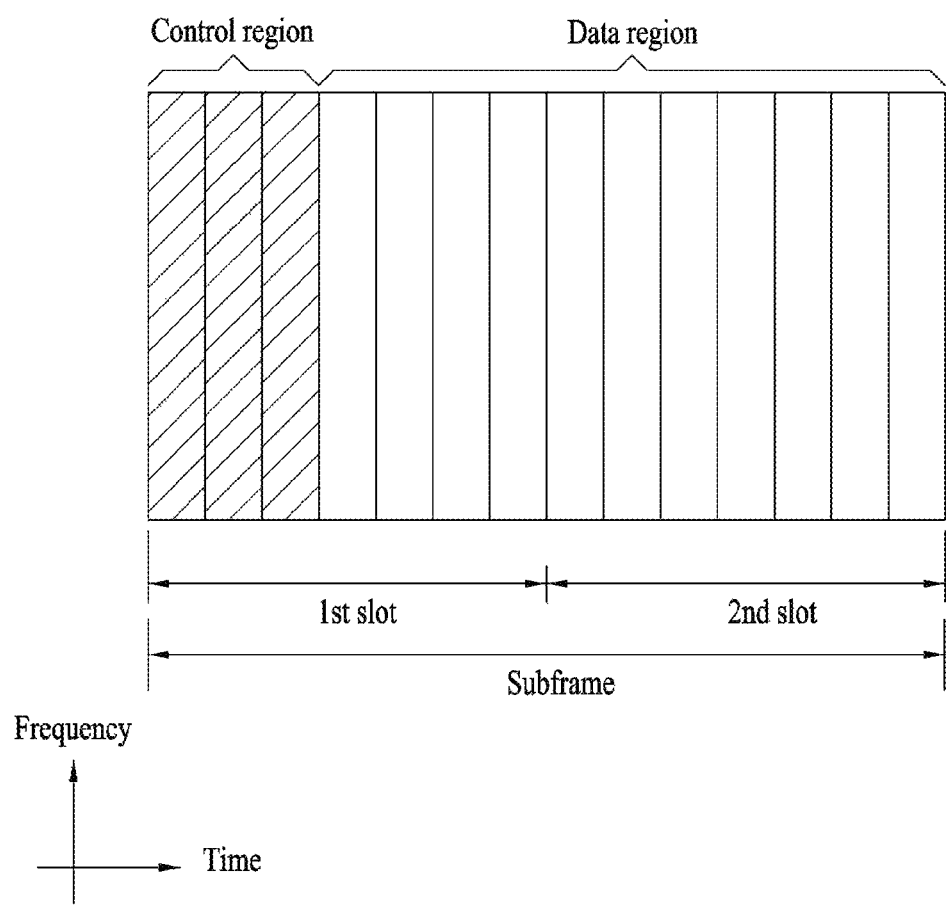
FIG. 3 is a diagram for an example of a downlink (DL) subframe structure used in 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

Search Space

| Type | Aggregation Level L | Size [in CCEs] | Number of PDCCH candidates $M^{(L)}$ |
|---|---|---|---|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
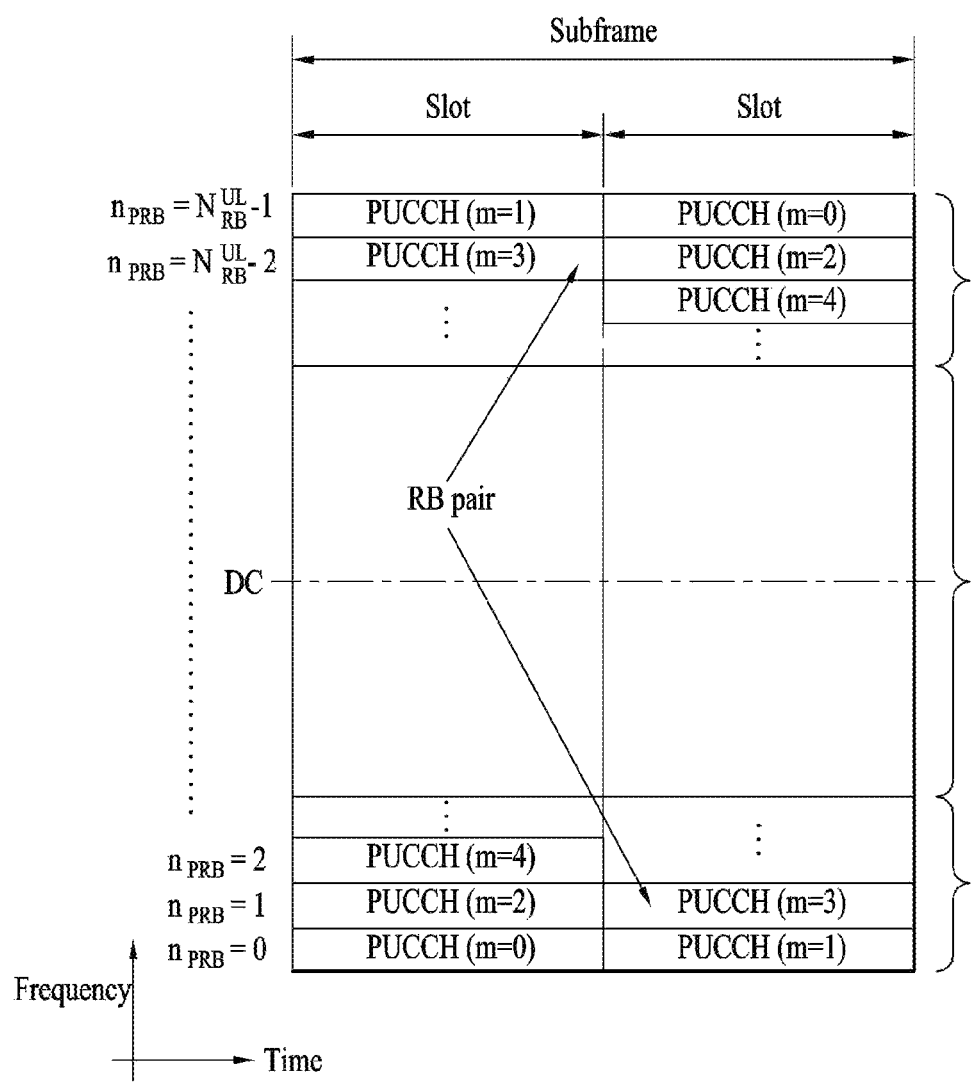
FIG. 4 is a diagram for an example of an uplink (UL) subframe structure used in 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned for UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

CSI Reporting

In the 3GPP LTE(-A) system, a user equipment (UE) is defined to report CSI to a BS. Herein, the CSI collectively refers to information indicating the quality of a radio channel (also called a link) created between a UE and an antenna port. The CSI includes, for example, a rank indicator (RI), a precoding matrix indicator (PMI), and a channel quality indicator (CQI). Herein, the RI, which indicates rank information about a channel, refers to the number of streams that a UE receives through the same time-frequency resource. The RI value is determined depending on long-term fading of the channel, and is thus usually fed back to the BS by the UE with a longer period than for the PMI and CQI. The PMI, which has a value reflecting the channel space property, indicates a precoding index preferred by the UE based on a metric such as SINR. The CQI, which has a value indicating the intensity of a channel, typically refers to a receive SINR which may be obtained by the BS when the PMI is used.

The UE calculates, based on measurement of the radio channel, a preferred PMI and RI from which an optimum or highest transmission rate may be derived when used by the BS in the current channel state, and feeds back the calculated PMI and RI to the BS. Herein, the CQI refers to a modulation and coding scheme providing an acceptable packet error probability for the PMI/RI that is fed back.

In the LTE-A system which is expected to include more precise MU-MIMO and explicit CoMP operations, current CSI feedback is defined in LTE, and thus new operations to be introduced may not be sufficiently supported. As requirements for CSI feedback accuracy for obtaining sufficient MU-MIMO or CoMP throughput gain became complicated, it has been agreed that the PMI should be configured with a long term/wideband PMI ($W_1$) and a short term/subband PMI ($W_2$). In other words, the final PMI is expressed as a function of $W_1$ and $W_2$. For example, the final PMI W may be defined as follows: $W=W_1*W_2$ or $W=W_2*W_1$. Accordingly, in LTE-A, the CSI may include RI, $W_1$, $W_2$ and CQI.

In the 3GPP LTE(-A) system, an uplink channel used for CSI transmission is configured as shown in Table 5.

TABLE 5

| Scheduling scheme | Periodic CSI transmission | Aperiodic CSI transmission |
|---|---|---|
| Frequency non-selective | PUCCH | — |
| Frequency selective | PUCCH | PUSCH |

Referring to Table 5, CSI may be transmitted with a periodicity defined in a higher layer, using a physical uplink control channel (PUCCH). When needed by the scheduler, a physical uplink shared channel (PUSCH) may be aperiodically used to transmit the CSI. Transmission of the CSI over the PUSCH is possible only in the case of frequency selective scheduling and aperiodic CSI transmission. Hereinafter, CSI transmission schemes according to scheduling schemes and periodicity will be described.

1) Transmitting the CQI/PMI/RI over the PUSCH after receiving a CSI transmission request control signal (a CSI request)

A PUSCH scheduling control signal (UL grant) transmitted over a PDCCH may include a control signal for requesting transmission of CSI. The table below shows modes of the UE in which the CQI, PMI and RI are transmitted over the PUSCH.

for the system band or set S. If there are multiple codewords for the M selected subbands, the UE defines a CQI value for each codeword in a differential form.

TABLE 6

|  |  | PMI Feedback Type | | |
| --- | --- | --- | --- | --- |
|  |  | No PMI | Single PMI | Multiple PMIs |
| PUSCH CQI Feedback Type | Wideband (Wideband CQI) |  |  | Mode 1-2<br>RI<br>1st wideband CQI(4 bit)<br>2nd wideband CQI(4 bit)<br>if RI > 1<br>N*Subband PMI(4 bit)<br>(N is the total # of subbands)<br>(if 8Tx Ant, N*subband W2 + wideband W1) |
|  | UE selected (Subband CQI) | Mode 2-0<br>RI (only for Open-loop SM)<br>1st wideband CQI(4 bit) + Best-M CQI(2 bit)<br>(Best-M CQI: An average CQI for M SBs selected from among N SBs)<br>Best-M index (L bit) |  | Mode 2-2<br>RI<br>1st wideband CQI(4 bit) + Best-M CQI(2 bit)<br>2nd wideband CQI(4 bit) + Best-M CQI(2 bit) if RI > 1<br>Best-M index (L bit)<br>Wideband PMI(4 bit) + Best-M PMI(4 bit)<br>(if 8Tx Ant, wideband W2 + Best-M W2 + wideband W1) |
|  | Higher Layer-configured (Subband CQI) | Mode 3-0<br>RI (only for Open-loop SM)<br>1st wideband CQI(4 bit) + N*subbandCQI(2 bit) | Mode 3-1<br>RI<br>1st wideband CQI(4 bit) + N*subbandCQI(2 bit)<br>2nd wideband CQI(4 bit) + N*subbandCQI(2 bit)<br>if RI > 1<br>Wideband PMI(4 bit)<br>(if 8Tx Ant, wideband W2 + wideband W1) | Mode 3-2<br>RI<br>1st wideband CQI(4 bit) + N*subbandCQI(2 bit)<br>2nd wideband CQI(4 bit) + N*subbandCQI(2 bit)<br>if RI > 1<br>N*Subband PMI(4 bit)<br>(N is the total # of subbands)<br>(if 8Tx Ant, N*subband W2 + wideband W1) | le;2qThe transmission modes in Table 6 are selected in a higher layer, and the CQI/PMI/RI are all transmitted in a PUSCH subframe. Hereinafter, uplink transmission methods for the UE according to the respective modes will be described.

Mode 1-2 represents a case where precoding matrices are selected on the assumption that data is transmitted only in subbands. The UE generates a CQI on the assumption of a precoding matrix selected for a system band or a whole band (set S) designated in a higher layer. In Mode 1-2, the UE may transmit a CQI and a PMI value for each subband. Herein, the size of each subband may depend on the size of the system band.

A UE in Mode 2-0 may select M preferred subbands for a system band or a band (set S) designated in a higher layer. The UE may generate one CQI value on the assumption that data is transmitted for the M selected subbands. Preferably, the UE additionally reports one CQI (wideband CQI) value In this case, the differential CQI value is determined as a difference between an index corresponding to the CQI value for the M selected subbands and a wideband (WB) CQI index.

The UE in Mode 2-0 may transmit, to a BS, information about the positions of the M selected subbands, one CQI value for the M selected subbands and a CQI value generated for the whole band or designated band (set S). Herein, the size of a subband and the value of M may depend on the size of the system band.

A UE in Mode 2-2 may select positions of M preferred subbands and a single precoding matrix for the M preferred subbands simultaneously on the assumption that data is transmitted through the M preferred subbands. Herein, a CQI value for the M preferred subbands is defined for each codeword. In addition, the UE additionally generates a wideband CQI value for the system band or a designated band (set S).

The UE in Mode 2-2 may transmit, to the BS, information about the positions of the M preferred subbands, one CQI value for the M selected subbands and a single PMI for the M preferred subbands, a wideband PMI, and a wideband CQI value. Herein, the size of a subband and the value of M may depend on the size of the system band.

A UE in Mode 3-0 generates a wideband CQI value. The UE generates a CQI value for each subband on the assumption that data is transmitted through each subband. In this case, even if RI>1, the CQI value represents only the CQI value for the first codeword.

A UE in Mode 3-1 generates a single precoding matrix for the system band or a designated band (set S). The UE generates a CQI subband for each codeword on the assumption of the single precoding matrix generated for each subband. In addition, the UE may generate a wideband CQI on the assumption of the single precoding matrix. The CQI value for each subband may be expressed in a differential form. The subband CQI value is calculated as a difference between the subband CQI index and the wideband CQI index. Herein, the size of each subband may depend on the size of the system band.

A UE in Mode 3-2 generates a precoding matrix for each subband in place of a single precoding matrix for the whole band, in contrast with the UE in Mode 3-1.

2) Periodic CQI/PMI/RI Transmission Over PUCCH

The UE may periodically transmit CSI (e.g., CQI/PMI/PTI (precoding type indicator) and/or RI information) to the BS over a PUCCH. If the UE receives a control signal instructing transmission of user data, the UE may transmit a CQI over the PUCCH. Even if the control signal is transmitted over a PUSCH, the CQI/PMI/PTI/RI may be transmitted in one of the modes defined in the following table.

TABLE 7

| | | PMI feedback type | |
|---|---|---|---|
| | | No PMI | Single PMI |
| PUCCH CQI feedback type | Wideband (wideband CQI) | Mode 1-0 | Mode 1-1 |
| | UE selective (subband CQI) | Mode 2-0 | Mode 2-1 |

A UE may be set in transmission modes as shown in Table 7. Referring to Table 7, in Mode 2-0 and Mode 2-1, a bandwidth part (BP) may be a set of subbands consecutively positioned in the frequency domain, and cover the system band or a designated band (set S). In Table 9, the size of each subband, the size of a BP and the number of BPs may depend on the size of the system band. In addition, the UE transmits CQIs for respective BPs in ascending order in the frequency domain so as to cover the system band or designated band (set S).

The UE may have the following PUCCH transmission types according to a transmission combination of CQI/PMI/PTI/RI.
i) Type 1: the UE transmits a subband (SB) CQI of Mode 2-0 and Mode 2-1.
ii) Type 1a: the UE transmits an SB CQI and a second PMI.
iii) Types 2, 2b and 2c: the UE transmits a WB-CQI/PMI.
iv) Type 2a: the UE transmits a WB PMI.
v) Type 3: the UE transmits an RI.
vi) Type 4: the UE transmits a WB CQI.
vii) Type 5: the UE transmits an RI and a WB PMI.
viii) Type 6: the UE transmits an RI and a PTI.

When the UE transmits an RI and a WB CQI/PMI, the CQI/PMI are transmitted in subframes having different periodicities and offsets. If the RI needs to be transmitted in the same subframe as the WB CQI/PMI, the CQI/PMI are not transmitted.

Aperiodic CSI Request

Currently, the LTE standard uses the 2-bit CSI request field in DCI format 0 or 4 to operate aperiodic CSI feedback when considering a carrier aggregation (CA) environment. When the UE is configured with several serving cells in the CA environment, the CSI request field is interpreted as two bits. If one of the TMs 1 through 9 is set for all CCs (Component Carriers), aperiodic CSI feedback is triggered according to the values in Table 8 below, and TM 10 for at least one of the CCs If set, aperiodic CSI feedback is triggered according to the values in Table 9 below.

TABLE 8

| A value of CSI request field | Description |
|---|---|
| '00' | No aperiodic CSI report is triggered |
| '01' | Aperiodic CSI report is triggered for a serving cell |
| '10' | Aperiodic CSI report is triggered for a first group of serving cells configured by a higher layer |
| '11' | Aperiodic CSI report is triggered for a second group of serving cells configured by a higher layer |

TABLE 9

| A value of CSI request field | Description |
|---|---|
| '00' | No aperiodic CSI report is triggered |
| '01' | Aperiodic CSI report is triggered for a CSI process group configured by a higher layer for a serving cell |
| '10' | Aperiodic CSI report is triggered for a first group of CSI processes configured by a higher layer |
| '11' | Aperiodic CSI report is triggered for a second group of CSI processes configured by a higher layer |

In a cellular communication system, a base station controls transmission and reception of data transceived with a plurality of user equipments and transmits scheduling information (e.g., time/frequency on which data is to be transmitted, MCS (modulation and coding scheme), HARQ (hybrid automatic retransmission request)-related information on downlink data transmitted to a user equipment) to the user equipment to enable the user equipment to receive data. Similarly, the base station informs the user equipment of uplink scheduling information to enable the user equipment to transmit uplink data. Recently, in order to support a wider bandwidth while utilizing a legacy band distinction, a CA (carrier aggregation) technology has been introduced to transmit downlink data to a single UE by aggregating unit CC (component carrier). In particular, LTE standard considers a self-CC scheduling technology that each cell transmits a control channel including scheduling information and a cross-CC scheduling technology that a cell transmits a control channel including scheduling information of a different cell in a situation that a plurality of CCs (component carriers) of a different duplex mode or the same duplex mode are aggregated. Although a current LTE standard considers CA that transmits downlink data by aggregating 5 CCs, recently, in order to support rapidly increasing traffic load, CA enhancement for transmitting downlink data by aggregating 5 or more CCs (e.g., 8, 16, 32 CCs) is considering. In this case, it is anticipated that the number of bits for UCI such as HARQ-ACK (acknowledgement), CSI (channel state information), and the like is to be rapidly increased. If an error occurs in performing transmission and detection, it may have a great ripple effect due to the error.

In a situation that a plurality of CCs (component carriers) of a different duplex mode or the same duplex mode are aggregated, the present invention proposes a method of performing rate matching when CSI on a plurality of DL cells and/or HARQ-ACK information on (a TB (transport block) of a plurality of DL cells are transmitted at the same time in a single subframe in a manner of being multiplexed to a PUCCH resource. In the following, for clarity, the proposed method is explained based on 3GPP LTE system. Yet, a system range to which the proposed method is applied can be extended to a different system rather than 3GPP LTE system.

According to a legacy 3GPP LTE Rel-10, a plurality of cells can be aggregated and CSI (channel state information) on an activated cell can be transmitted via a PUCCH resource or a PUSCH resource. When CSI on a single cell or a plurality cells is periodically reported, a collision may occur in the same subframe between the CSI reports. In this case, single CSI report is selected according to a reporting type and a priority of a cell and the remaining CSI information is dropped. If the number of cells corresponding to a target of CA is increased, the number of CSI reports is also increased. In this case, due to excessive CSI drop, DL throughput capability can be deteriorated. Hence, in order to solve or reduce the problem, a next system considers transmitting a plurality of periodic CSI reports at the same time in the same subframe.

According to a current standard, a CQI and a bit width of a precoding information field can be changed according to conditions described in the following.

TM

Whether or not PMI/RI report is set

Number of antenna ports

Rank value

Whether or not 4Tx enhanced codebook is set (by alternativeCodebookEnabledFor4Tx-r12)

In particular, if an eNB misses CSI feedback corresponding to an RI, the eNB is unable to correctly anticipate a CQI and a bit width of a precoding information field. The eNB may infer CQI/PMI by performing a plurality of blind detections or determine that CQI/PMI is not valid. Yet, when multiple periodic CSI corresponding to a plurality of cells or CSI processes are transmitted on a single PUCCH, if an RI corresponding to a plurality of cells or CSI processes is missed or a decoding error occurs, it is expected that the eNB has difficulty in comprehending corresponding information due to size ambiguity for CQI of a corresponding cell/CSI process and a precoding information field.

For example, when RI feedback on cells 1, 2, and 3 is transmitted on PUCCH in an SF # n and CQI and/or PMI feedback on cells 1, 2, and 3 is transmitted on PUCCH in an SF #(n+k), a bit width for each cell is shown in Table 10. When the RI feedback on cells 1, 2, and 3 is transmitted in the SF # n, if a decoding error occurs, it is difficult for an eNB to anticipate a bit width for the CQI and/or PMI feedback on cells 1, 2, and 3 in the SF #(n+k) or blind detection count is rapidly increased (compared to a case of transmitting single periodic CSI only). Consequently, it is difficult for the eNB to utilize CQI/PMI information as well.

TABLE 10

| | Cell 1 | Cell 2 | Cell 3 |
|---|---|---|---|
| Condition to determine the bit widths for RI | TM4 2 antenna ports | TM 9 4 antenna ports with PMI/RI reporting max 4 layers | TM 9 8 antenna ports with PMI/RI reporting max 8 layers |
| Bit width at SF #n RI values | RI: 1 Rank = 1 | RI: 2 Rank = 1 | RI: 3 Rank = 2 |
| Bit width at SF #(n + k) | CQI/PMI = 6 | CQI/PMI = 8 | CQI/PMI = 11 |

As a different example, when RI feedback on cells 1 and 2 and CQI feedback on a cell 3 are transmitted on PUCCH in an SF # n and CQI and/or PMI feedback on cells 1 and 2 and RI feedback on a cell 3 are transmitted on PUCCH in an SF #(n+k), a bit width for each cell is shown in Table 11. When the RI feedback on cells 1 and 2 is transmitted in the SF # n, if a decoding error occurs, it is difficult for an eNB to anticipate a bit width for the CQI and/or PMI feedback on cells 1 and 2 in the SF #(n+k) and the eNB may lose RI information on the cell 3. This causes bit width ambiguity for CQI/PMI feedback on the cell 3 and it may lead to additional CSI loss.

TABLE 11

| | Cell 1 | Cell 2 | Cell 3 |
|---|---|---|---|
| Condition to determine the bit widths for RI | TM4 2 antenna ports | TM 9 4 antenna ports with PMI/RI reporting max 4 layers | TM 9 8 antenna ports with PMI/RI reporting max 8 layers |
| Bit width at SF #n RI values | RI: 1 Rank = 1 | RI: 2 Rank = 1 | CQI/PMI = 11 — |
| Bit width at SF #(n + k) | CQI/PMI = 6 | CQI/PMI = 8 | RI: 3 |

When CSI on a plurality of cells/CSI processes are transmitted in a manner of being multiplexed, the present invention proposes a method of performing rate matching according to a configuration of each CSI group and the number of bits. In this case, the CSI can be restricted to periodic CSI only except aperiodic CSI.

[Proposal 1] Determining Input Bit for Multiple CSI

[1-1] Method of Determining the Number of Input Bits According to CSI

When CSI for a plurality of cells/CSI processes are multiplexed and transmitted at the same time in a specific subframe via the same channel (e.g., PUCCH or PUSCH), it may be able to define a rule that the number of virtual input bits of a channel encoder for each CSI is defined/promised or signaled (via RRC/physical layer signaling) and coding is applied. In the following, a method of determining the virtual input bits of a channel encoder according to CSI is explained in more detail.

(Method 1): Configuration of the number of virtual input bits can be restricted to CSI that a bit width varies according to a rank value.

(Method 2): The number of virtual input bits of specific CSI can be calculated by predefined/preconfigured "the maximum number of CSI bits according to corresponding CSI". As a different example, the number of virtual input bits of specific CSI can be calculated by predefined/preconfigured "the maximum number of CSI bits according to the number of antenna ports of corresponding CSI".

(Method 3): The number of virtual input bits corresponding to CSI report that a bit width is not changed according to a rank value can be configured to be identical to the number of actual CSI bits. More generally, if the number of virtual input bits of specific CSI and the number of actual CSI bits correspond to $N_v$ and $N_a$, respectively, it may configure as $N_v \geq N_a$.

(Method 4) $(N_v - N_a)$ bits can be filled with a predetermined specific value (fixed bits). For example, in order to generate a virtual input bit, an actual CSI bit can be padded with zero bits.

[1-2] Method of Determining the Number of Input Bits According to PUCCH Reporting Type/Mode When CSI for a plurality of cells/CSI processes are multiplexed and transmitted at the same time in a specific subframe via the same channel (e.g., PUCCH or PUSCH), it may be able to define a rule that the number of virtual input bits of a channel encoder is defined/promised according to a PUCCH reporting type or signaled (via RRC/physical layer signaling) and coding is applied. In the following, a method of determining the virtual input bits of a channel encoder according to a PUCCH reporting type is explained in more detail.

(Method 1): A bit width of CSI (e.g., CQI/PMI) corresponding to a specific PUCCH reporting type Y having a relatively lower protection priority or a smaller transmission interval is differently determined according to a value of CSI (e.g., RI) corresponding to a specific PUCCH reporting type X having a high protection priority or a big transmission interval. In this case, when the CSI corresponding to the specific PUCCH reporting type Y is transmitted, the number of virtual input bits corresponding to the CSI can be configured by "maximum size (e.g., maximum bit width) among bit widths capable of being determined according to a value of CSI corresponding to a random PUCCH reporting type X". In this case, the "maximum size among bit widths capable of being determined according to a value of CSI corresponding to a random PUCCH reporting type X" can be configured in consideration of an antenna port set to the CSI.

(Method 2): The number of virtual input bits of CSI corresponding to a specific PUCCH reporting type can be calculated by predefined/preconfigured or signaled "the maximum number of CSI bits according to PUCCH reporting type". As a different example, the number of virtual input bits of CSI corresponding to a specific PUCCH reporting type can be calculated by predefined/preconfigured or signaled "the maximum number of CSI bits according to the number of antenna ports of the CSI".

(Method 3): The number of virtual input bits of CSI corresponding to PUCCH reporting type that a bit width is not changed according to a rank value can be configured to be identical to the number of actual CSI bits. More generally, if the number of virtual input bits of CSI corresponding to a specific PUCCH reporting type and the number of actual CSI bits correspond to $N_v$ and $N_a$, respectively, it may configure as $N_v \geq N_a$.

(Method 4): A UE can deploy/map a value of CSI corresponding to a PUCCH reporting type Y of which a bit width is determined according to a value of CSI corresponding to an actual PUCCH reporting type X (e.g., most recently reported) to a predetermined position (e.g., a lower bit index first) within a CSI payload which is configured based on a maximum bit width in the (method 1). The remaining bit indexes except a part to which the value of the CSI corresponding to the actual PUCCH reporting type Y is deployed/mapped within the CSI payload can be padded with a fixed value or a predetermined specific value. For example, the remaining bit indexes can be padded with zero bits. Or, the remaining bit indexes can be padded with a specific value indicating the total bit width of the CSI corresponding to the actual PUCCH reporting type Y.

Figure 5:
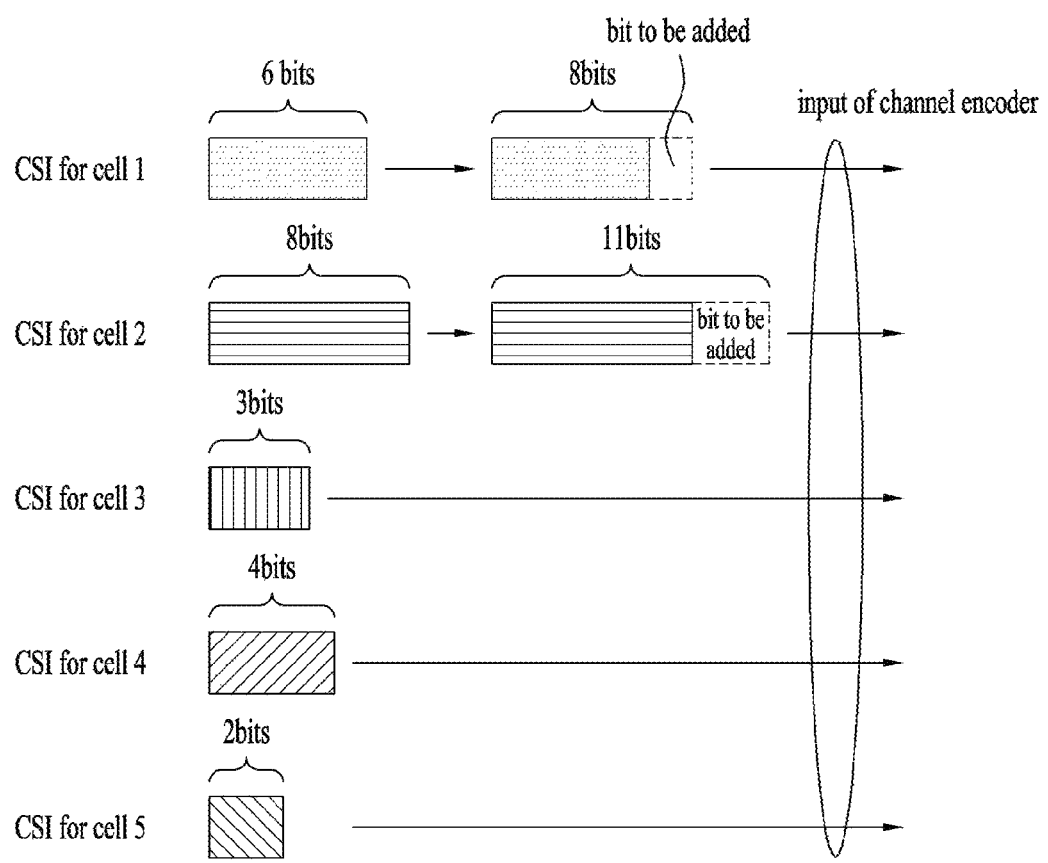
FIG. 5 is a diagram illustrating an example of controlling the number of input bits of a channel encoder according to one embodiment of the present invention.

For example, FIG. 5 illustrates a case of transmitting feedback on "wideband CQI+PMI" for a cell 1, "wideband CQI+wideband PMI" for a cell 2, "RI" for a cell 3, "wideband CQI" for a cell 4, and "RI" for a cell 5 via a single UL channel. When a PUCCH reporting type corresponding to CSI of each cell corresponds to 2, 2c, 3, 4, and 6 and the number of actual CSI bits for each cell corresponds to 6, 8, 3, 4, and 2 bits, the number of virtual input bits of CSI for each cell can be configured by 8, 11, 3, 4, and 2 bits in advance. It may be able to apply final coding by padding a defined/promised bit in accordance with the number of virtual input bits.

When CSI for a plurality of cells/CSI processes are multiplexed and transmitted at the same time in a specific subframe via the same channel, it may be able to define a rule that the number of virtual input bits of a channel encoder is defined/promised according to a combination of a PUCCH reporting type and a PUCCH reporting mode (via RRC/physical layer signaling) and signaling and coding can be applied.

When CSI for a plurality of cells/CSI processes are multiplexed and transmitted at the same time in a specific subframe via the same channel, it may be able to define a rule that the number of virtual input bits of a channel encoder is defined/promised according to a combination of all or a part of a PUCCH reporting type, a PUCCH reporting mode, and the number of antenna ports (via RRC/physical layer signaling) and signaling and coding can be applied.

[1-3] Method of Determining the Number of Input Bits According to CSI Group

When CSI for a plurality of cells/CSI processes are multiplexed and transmitted at the same time in a specific subframe via the same channel (e.g., PUCCH or PUSCH), it may be able to define a rule that the number of virtual input bits is defined/promised according to "CSI group" corresponding to a set of CSI which are grouped and jointly coded according to a coding block or signaled (via RRC/physical layer signaling) and coding is applied. In this case, the number of virtual input bits of a specific CSI group can be calculated by (the number of CSI belonging to the specific CSI group)*(maximum bit width). As a different example, a maximum value of the number of virtual input bits of a specific CSI group is configured/designated according to CSI and the maximum value can also be calculated by totaling up within the group.

In the following description/proposal, a case of defining/designating a CSI group according to "whether or not a bit width is changed according to a rank value" is illustrated, by which the present invention may be non-limited. The case can be applied to all methods for grouping CSI according to a different condition and determining the number of input bits. For example, a CSI group corresponding to CSI report of which a bit width is changed according to a rank value is referred to as a CSI group 1 and a joint report on all or a part of wideband/subband CQI, spatial differential CQI, wideband PMI, subband label, and wideband/subband i2 can be included in the CSI group 1. A CSI group corresponding to CSI report of which a bit width is not changed according to a rank value is referred to as a CSI group 2 and a joint report on RI or RI and precoding information i1, a joint report on RI and PTI, and CSI report such as wideband CQI can be included in the CSI group 2.

Or, the number of virtual input bits can be set to only the CSI group corresponding to CSI report of which a bit width is changed according to a rank value. Or, the number of virtual input bits of a CSI group corresponding to CSI report of which a bit width is not changed according to a rank value can be configured to be identical to the number of actual CSI bits.

A UE can deploy/map a plurality of CSI corresponding to a CSI group to a predetermined position (e.g., a lower bit index first) within a CSI payload which is configured based on the number of virtual input bits according to a priority of a CC and/or a CSI process (or, according to a priority of a reporting type/mode for a plurality of the CSI). The remaining bit indexes except a part to which values of a plurality of the CSI corresponding to the actual CSI group are deployed/mapped within the CSI payload can be padded with a fixed value or a predetermined specific value. For example, the remaining bit indexes can be padded with zero bits. Or, the remaining bit indexes can be padded with a specific value indicating the total bit width of a plurality of the CSI corresponding to the actual CSI group.

Figure 6:
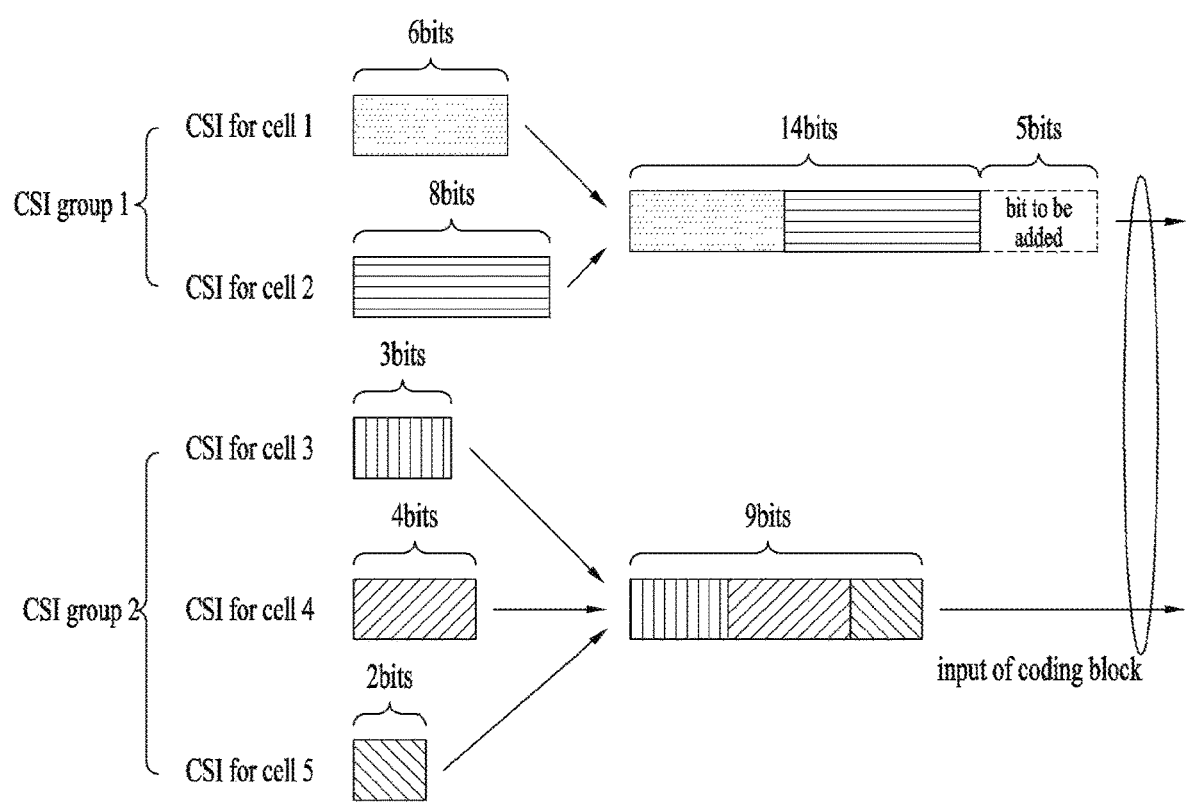
FIG. 6 is a diagram illustrating an example of controlling the number of input bits of a channel encoder according to one embodiment of the present invention.

For example, FIG. 6 illustrates a case of transmitting feedback on "wideband CQI+PMI" for a cell 1, "wideband CQI+wideband PMI" for a cell 2, "RI" for a cell 3, "wideband CQI" for a cell 4, and "RI" for a cell 5 via a single UL channel.

CSI for cells 1 and 2 and CSI for cells 3, 4, and 5 can be defined/designated as a CSI group 1 and a CSI group 2, respectively. If it is assumed that the number of actual CSI bits of the CSI group 1 corresponds to 14 (=6+8) bits and the number of actual CSI bits of the CSI group 2 corresponds to 9 (=3+4+2) bits, in case of the CSI group 1, the number of virtual input bits according to a CSI group can be configured by 19 (=8+11) bits. In case of the CSI group 2, the number of virtual input bits according to a CSI group can be configured by 9 bits. It may be able to apply final coding by padding a defined/promised bit (e.g., zero bit padding) in accordance with the number of virtual input bits.

[Proposal 2] Determining Coded Bit for Multiple CSI

[2-1] Method of Determining the Number of Coded Bits According to CSI

When CSI for a plurality of cells/CSI processes are multiplexed and transmitted at the same time in a specific subframe via the same channel (e.g., PUCCH or PUSCH), it may be able to define a rule that the number of virtual coded bits of a channel encoder for each CSI is defined/promised or signaled (via RRC/physical layer signaling). In the following, a method of determining the virtual coded bits of a channel encoder according to CSI is explained in more detail.

(Method 1): Configuration of the number of virtual coded bits can be restricted to CSI that a bit width varies according to a rank value.

(Method 2): The number of virtual coded bits of specific CSI can be calculated by predefined/preconfigured "the maximum number of CSI bits according to corresponding CSI". As a different example, the number of virtual coded bits of specific CSI can be calculated by predefined/preconfigured "the maximum number of CSI bits according to the number of antenna ports of corresponding CSI".

(Method 3): The number of virtual coded bits corresponding to CSI report that a bit width is not changed according to a rank value can be configured to be identical to the number of actual coded bits. More generally, if the number of virtual coded bits of specific CSI and the number of actual coded bits correspond to $N_{vc}$ and $N_{ac}$, respectively, it may configure as $N_{vc} \geq N_{ag}$.

(Method 4): $(N_{vc}-N_{ac})$ bits can be filled with a predetermined specific value (fixed bits). For example, zero bits as many as the $(N_{vc}-N_{ac})$ bits can be padded. In order to match the number of final coded bits with the $N_{vc}$, $(N_{vc}-N_{ac})$ bits can be generated via circular repetition.

[2-2] Method of Determining the Number of Coded Bits According to PUCCH Reporting Type/Mode When CSI for a plurality of cells/CSI processes are multiplexed and transmitted at the same time in a specific subframe via the same channel (e.g., PUCCH or PUSCH), it may be able to define a rule that the number of virtual coded bits of a channel encoder is defined/promised according to a PUCCH reporting type or signaled (via RRC/physical layer signaling) and coding is applied.

Or, when CSI for a plurality of cells/CSI processes are multiplexed and transmitted at the same time in a specific subframe via the same channel, it may be able to define a rule that the number of virtual coded bits of a channel encoder is defined/promised according to a combination of a PUCCH reporting type and a PUCCH reporting mode (via RRC/physical layer signaling) and signaling and coding can be applied.

Or, when CSI for a plurality of cells/CSI processes are multiplexed and transmitted at the same time in a specific subframe via the same channel, it may be able to define a rule that the number of virtual coded bits of a channel encoder is defined/promised according to a combination of all or a part of a PUCCH reporting type, a PUCCH reporting mode, and the number of antenna ports (via RRC/physical layer signaling) and signaling and coding can be applied. In the following, a method of determining the number of virtual coded bits of a channel encoder according to a PUCCH reporting type/reporting mode is explained in more detail.

(Method 1): Configuration of the number of virtual coded bits can be restricted to PUCCH reporting type/reporting mode that a bit width varies according to a rank value.

(Method 2): The number of virtual coded bits of specific PUCCH reporting type/reporting mode can be calculated by predefined/preconfigured "the maximum number of CSI bits according to corresponding PUCCH reporting type/reporting mode". As a different example, the number of virtual coded bits of specific PUCCH reporting type/reporting mode can be calculated by predefined/preconfigured "the maximum number of CSI bits according to the number of antenna ports of corresponding PUCCH reporting type/reporting mode".

(Method 3): The number of virtual coded bits corresponding to PUCCH reporting type/reporting mode that a bit width is not changed according to a rank value can be configured to be identical to the number of actual coded bits. More generally, if the number of virtual coded bits of specific PUCCH reporting type/reporting mode and the number of actual coded bits correspond to $N_{vc}$ and $N_{ac}$, respectively, it may configure as $N_{vc} \geq N_{ac}$.

(Method 4): $(N_{vc}-N_{ac})$ bits can be filled with a predetermined specific value (fixed bits). For example, zero bits as many as the $(N_{vc}-N_{ac})$ bits can be padded. In order to match the number of final coded bits with the $N_{vc}$, $(N_{vc}-N_{ac})$ bits can be generated via circular repetition.

[2-3] Method of Determining the Number of Coded Bits According to CSI Group

When CSI for a plurality of cells/CSI processes are multiplexed and transmitted at the same time in a specific subframe via the same channel (e.g., PUCCH or PUSCH), it may be able to define a rule that the number of virtual coded bits is defined/promised according to "CSI group" corresponding to a set of CSI which are grouped and jointly coded according to a coding block or signaled (via RRC/physical layer signaling) and coding is applied. In this case, the number of virtual coded bits of a specific CSI group can be calculated by (the number of CSI belonging to the specific CSI group)*(maximum number of CSI coded bits). As a different example, a maximum value of the number of virtual coded bits of a specific CSI group is configured/designated according to CSI and the maximum value can also be calculated by totaling up within the group.

In the following description/proposal, a case of defining/designating a CSI group according to "whether or not a bit width is changed according to a rank value" is illustrated, by which the present invention may be non-limited. The case can be applied to all methods for grouping CSI according to a different condition and determining the number of coded bits. For example, a CSI group corresponding to CSI report of which a bit width is changed according to a rank value is referred to as a CSI group 1 and a joint report on all or a part of wideband/subband CQI, spatial differential CQI, wideband PMI, subband label, and wideband/subband i2 can be included in the CSI group 1. A CSI group corresponding to CSI report of which a bit width is not changed according to a rank value is referred to as a CSI group 2 and a joint report on RI or RI and precoding information i1, a joint report on RI and PTI, and CSI report such as wideband CQI can be included in the CSI group 2.

Or, the number of virtual coded bits can be set to only the CSI group corresponding to CSI report of which a bit width is changed according to a rank value. Or, the number of virtual coded bits of a CSI group corresponding to CSI report of which a bit width is not changed according to a rank value can be configured to be identical to the number of actual coded bits.

[Proposal 3] CRC Masking for Multiple CSI

If a length of a CRC is equal to or greater than a certain length, it may consider transmitting additional information by masking the CRC. When CSI for a plurality of cells/CSI processes are multiplexed and transmitted at the same time in a specific subframe via the same channel and a CRC is generated, following alternatives correspond to an example for the additional information capable of being considered when CRC masking is performed.

- alt1: When a configuration of an actual bit width is indicated according to a cell/CSI process, it may consider CRC masking.
- alt2: When a configuration of an actual bit width is indicated according to a CSI group, it may consider CRC masking.
- alt3: When a configuration of an actual bit width is indicated according to CSI for a partial specific CSI only, it may consider CRC masking. For example, it may be able to indicate a configuration of a bit width according to CSI by utilizing CRC masking for a CSI report that a bit width is changed according to a rank value only.

Since it is able to include the examples for the proposed method as one of implementation methods of the present invention, it is apparent that the examples are considered as a sort of proposed methods. Although the embodiments of the present invention can be independently implemented, the embodiments can also be implemented in a combined/aggregated form of a part of embodiments. It may define a rule that an eNB/location server informs a UE of information on whether to apply the proposed methods (or, information on rules of the proposed methods) via a predefined signal (e.g., physical layer signal or higher layer signal).

Figure 7:
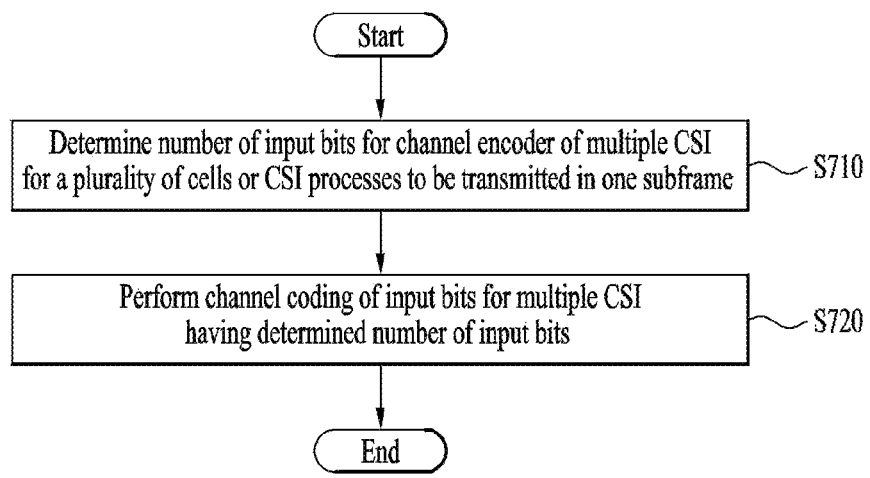
FIG. 7 is a flowchart illustrating an operation according to one embodiment of the present invention.

FIG. 7 is a flowchart illustrating an operation according to one embodiment of the present invention.

FIG. 7 relates to a method of performing channel coding of channel state information in a wireless communication system. The method is performed by a user equipment (UE). When multiple CSI are multiplexed and transmitted via a single channel in a subframe, the method relates to determination of the number of input bits of a channel encoder before the multiple CSIs are transmitted. The method is used for a receiving end of CSI, i.e., a base station or an eNB to lower complexity of blind decoding of the multiplexed CSI.

The UE can determine the number of input bits for a channel encoder of multiple CSI for a plurality of cells or CSI processes to be transmitted in a subframe [S710]. The UE can perform channel coding on input bits for the multiple CSI of the determined number of input bits [S720]. The number of input bits for the multiple CSI may correspond to the sum of input bits of CSIs which are determined according to an individual CSI, a CSI group, a PUCCH (physical uplink control channel) reporting type, or a PUCCH reporting mode.

If the number of input bits for the channel encoder of the multiple CSI corresponds to the sum of input bits of CSIs determined according to an individual CSI, actual individual CSI bit can be padded with the prescribed number of fixed bits for a type of individual CSI that a bit width is changed according to a rank value of a downlink channel.

The number of input bits determined according to the individual CSI can be calculated by the maximum number of bits configured according to a type of CSI or the number of antenna ports of the individual CSI.

If the number of input bits for the channel encoder of the multiple CSI corresponds to the sum of input bits of CSIs determined according to a CSI group, actual individual CSI bit of a corresponding CSI group can be padded with the prescribed number of fixed bits for a CSI group including a CSI that a bit width is changed according to a rank value of a downlink channel.

If the number of input bits for the channel encoder of the multiple CSI corresponds to the sum of input bits of CSIs determined according to a PUCCH reporting type or a PUCCH reporting mode, the number of input bits for a first PUCCH reporting type/PUCCH reporting mode can be determined by a maximum bit width of a second PUCCH reporting type/PUCCH reporting mode that determines a bit width of CSI of the first PUCCH reporting type/PUCCH reporting mode.

Input bits for the first PUCCH reporting type/PUCCH reporting mode can include actual CSI bits mapped to a predetermined position and fixed bits mapped to the remaining position.

If the number of input bits for the channel encoder of the multiple CSI corresponds to the sum of input bits of CSIs determined according to a PUCCH reporting type or a PUCCH reporting mode, the number of input bits for the PUCCH reporting type/PUCCH reporting mode can be calculated by the maximum number of bits configured according to the PUCCH reporting type/PUCCH reporting mode or the maximum number of bits configured according to the number of antenna ports of individual CSI.

If the number of input bits for the channel encoder of the multiple CSI corresponds to the sum of input bits of CSIs determined according to a PUCCH reporting type or a PUCCH reporting mode, the method can further include the step of receiving information on the number of input bits of the channel encoder configured according to a combination of the PUCCH reporting type and the PUCCH reporting mode.

If the number of input bits for the channel encoder of the multiple CSI corresponds to the sum of input bits of CSIs determined according to a PUCCH reporting type or a PUCCH reporting mode, the method can further include the step of receiving information on the number of input bits of the channel encoder configured according to a combination of all or a part of the PUCCH reporting type, the PUCCH reporting mode, and the number of antenna ports.

And, the coded bits for the multiple CSI may use CRC (cyclic redundancy check) mask as an indicator indicating the number of actual CSI bits according to a plurality of the cells or CSI processes, individual CSI, or a CSI group.

In the foregoing description, embodiments of the present invention have been briefly explained with reference to FIG. 7. An embodiment related to FIG. 7 can alternatively or additionally include at least a part of the aforementioned embodiments.

Since it is able to include the examples for the proposed method as one of implementation methods of the present invention, it is apparent that the examples are considered as a sort of proposed methods. Although the embodiments of the present invention can be independently implemented, the embodiments can also be implemented in a combined/aggregated form of a part of embodiments. It may define a rule that an eNB/location server informs a UE of information on whether to apply the proposed methods (or, information on rules of the proposed methods) via a predefined signal (e.g., physical layer signal or higher layer signal).

Figure 8:
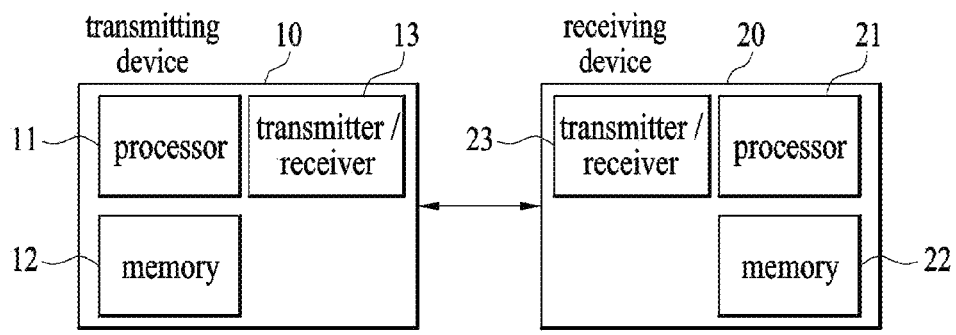
FIG. 8 is a block diagram of a device for implementing embodiment(s) of the present invention.

FIG. 8 is a block diagram illustrating a transmitting device 10 and a receiving device 20 configured to implement embodiments of the present invention. Each of the transmitting device 10 and receiving device 20 includes a transmitter/receiver 13, 23 capable of transmitting or receiving a radio signal that carries information and/or data, a signal, a message, etc., a memory 12, 22 configured to store various kinds of information related to communication with a wireless communication system, and a processor 11, 21 operatively connected to elements such as the transmitter/receiver 13, 23 and the memory 12, 22 to control the memory 12, 22 and/or the transmitter/receiver 13, 23 to allow the device to implement at least one of the embodiments of the present invention described above.

The memory 12, 22 may store a program for processing and controlling the processor 11, 21, and temporarily store input/output information. The memory 12, 22 may also be utilized as a buffer. The processor 11, 21 controls overall operations of various modules in the transmitting device or the receiving device. Particularly, the processor 11, 21 may perform various control functions for implementation of the present invention. The processors 11 and 21 may be referred to as controllers, microcontrollers, microprocessors, microcomputers, or the like. The processors 11 and 21 may be achieved by hardware, firmware, software, or a combination thereof. In a hardware configuration for an embodiment of the present invention, the processor 11, 21 may be provided with application specific integrated circuits (ASICs) or digital signal processors (DSPs), digital signal processing devices (DSPDs), programmable logic devices (PLDs), and field programmable gate arrays (FPGAs) that are configured to implement the present invention. In the case which the present invention is implemented using firmware or software, the firmware or software may be provided with a module, a procedure, a function, or the like which performs the functions or operations of the present invention. The firmware or software configured to implement the present invention may be provided in the processor 11, 21 or stored in the memory 12, 22 to be driven by the processor 11, 21.

The processor 11 of the transmitter 10 performs predetermined coding and modulation of a signal and/or data scheduled by the processor 11 or a scheduler connected to the processor 11, and then transmits a signal and/or data to the transmitter/receiver 13. For example, the processor 11 converts a data sequence to be transmitted into K layers through demultiplexing and channel coding, scrambling, and modulation. The coded data sequence is referred to as a codeword, and is equivalent to a transport block which is a data block provided by the MAC layer. One transport block is coded as one codeword, and each codeword is transmitted to the receiving device in the form of one or more layers. To perform frequency-up transformation, the transmitter/receiver 13 may include an oscillator. The transmitter/receiver 13 may include Nt transmit antennas (wherein Nt is a positive integer greater than or equal to 1).

The signal processing procedure in the receiving device 20 is configured as a reverse procedure of the signal processing procedure in the transmitting device 10. The transmitter/receiver 23 of the receiving device 20 receives a radio signal transmitted from the transmitting device 10 under control of the processor 21. The transmitter/receiver 23 may include Nr receive antennas, and retrieves baseband signals by frequency down-converting the signals received through the receive antennas. The transmitter/receiver 23 may include an oscillator to perform frequency down-converting. The processor 21 may perform decoding and demodulation on the radio signal received through the receive antennas, thereby retrieving data that the transmitting device 10 has originally intended to transmit.

The transmitter/receiver 13, 23 includes one or more antennas. According to an embodiment of the present invention, the antennas function to transmit signals processed by the transmitter/receiver 13, 23 are to receive radio signals and deliver the same to the transmitter/receiver 13, 23. The antennas are also called antenna ports. Each antenna may correspond to one physical antenna or be configured by a combination of two or more physical antenna elements. A signal transmitted through each antenna cannot be decomposed by the receiving device 20 anymore. A reference signal (RS) transmitted in accordance with a corresponding antenna defines an antenna from the perspective of the receiving device 20, enables the receiving device 20 to perform channel estimation on the antenna irrespective of whether the channel is a single radio channel from one physical antenna or a composite channel from a plurality of physical antenna elements including the antenna. That is, an antenna is defined such that a channel for delivering a symbol on the antenna is derived from a channel for delivering another symbol on the same antenna. An transmitter/receiver supporting the Multiple-Input Multiple-Output (MIMO) for transmitting and receiving data using a plurality of antennas may be connected to two or more antennas.

In embodiments of the present invention, the UE or the terminal operates as the transmitting device 10 on uplink, and operates as the receiving device 20 on downlink. In embodiments of the present invention, the eNB or the base station operates as the receiving device 20 on uplink, and operates as the transmitting device 10 on downlink.

The transmitting device and/or receiving device may be implemented by one or more embodiments of the present invention among the embodiments described above.

Detailed descriptions of preferred embodiments of the present invention have been given to allow those skilled in the art to implement and practice the present invention. Although descriptions have been given of the preferred embodiments of the present invention, it will be apparent to those skilled in the art that various modifications and variations can be made in the present invention defined in the appended claims. Thus, the present invention is not intended to be limited to the embodiments described herein, but is intended to have the widest scope consistent with the principles and novel features disclosed herein.

INDUSTRIAL APPLICABILITY

The present invention is applicable to wireless communication devices such as a terminal, a relay, and a base station.

What is claimed is:

1. A method for performing channel coding on channel state information (CSI) by a terminal in a wireless communication system, the method comprising:
    determining a number of input bits for a channel encoder related to multiple CSI for a plurality of cells to be transmitted in a subframe; and
    performing channel coding for the multiple CSI with the determined number of input bits,
    wherein the number of input bits of the multiple CSI is determined based on a transmission interval of a physical uplink control channel (PUCCH) reporting type for each cell included in the plurality of the cells,
    wherein a number of input bits for a first PUCCH reporting type corresponding to CSI of a first cell among the plurality of the cells is determined as a maximum bit width of a second PUCCH reporting type corresponding to CSI of a second cell among the plurality of the cells,
    wherein a bit width of CSI of the first PUCCH reporting type is determined based on the second PUCCH reporting type, and
    wherein the transmission interval of the first PUCCH reporting type is smaller than the transmission interval of the second PUCCH reporting type.

2. The method of claim 1, wherein the number of input bits for the first PUCCH reporting type comprises a number of actual CSI bits for the first PUCCH reporting type mapped to a predetermined position and a number of fixed bits mapped to a remaining position.

3. The method of claim 1, wherein the number of input bits for the PUCCH reporting type is calculated based on a maximum number of bits configured per PUCCH reporting type or a maximum number of bits configured according to a number of antenna ports of an individual CSI.

4. The method of claim 1, further comprising:
    receiving information on the number of input bits of the channel encoder configured per combination of the PUCCH reporting type and a PUCCH reporting mode.

5. The method of claim 1, further comprising:
    receiving information on the number of input bits of the channel encoder configured per combination of all or a part of the PUCCH reporting type, a PUCCH reporting mode, and a number of antenna ports.

6. The method of claim 1, wherein bits for the coded multiple CSI include a cyclic redundancy check (CRC) mask as an indicator indicating the number of actual CSI bits per the plurality of cells.

7. A terminal configured to perform channel coding on channel state information (CSI) in a wireless communication system, the terminal comprising:
    a transmitter and a receiver; and
    a processor that controls the transmitter and the receiver,
    wherein the processor determines a number of input bits for a channel encoder related to multiple CSI for a plurality of cells or CSI processes to be transmitted in a subframe, and performs channel coding of input bits for the multiple CSI with the determined number of input bits,
    wherein the number of input bits of the multiple CSI is determined based on a transmission interval of a physical uplink control channel (PUCCH) reporting type for each cell included in the plurality of the cells,
    wherein a number of input bits for a first PUCCH reporting type corresponding to CSI of a first cell among the plurality of the cells is determined as a maximum bit width of a second PUCCH reporting type corresponding to CSI of a second cell among the plurality of the cells,
    wherein a bit width of CSI of the first PUCCH reporting type is determined based on the second PUCCH reporting type, and
    wherein the transmission interval of the first PUCCH reporting type is smaller than the transmission interval of the second PUCCH reporting type.

8. The terminal of claim 7, wherein the number of input bits for the first PUCCH reporting type comprises a number of actual CSI bits for the first PUCCH reporting type mapped to a predetermined position and a number of fixed bits mapped to a remaining position.

9. The terminal of claim 7, wherein the number of input bits for the PUCCH reporting type is calculated based on a maximum number of bits configured per PUCCH reporting type or a maximum number of bits configured according to a number of antenna ports of an individual CSI.

10. The terminal of claim 7, wherein the processor controls the receiver to receive information on the number of input bits of the channel encoder configured per combination of the PUCCH reporting type and a PUCCH reporting mode.

11. The terminal of claim 7, wherein the processor receives information on the number of input bits of the channel encoder configured per combination of all or a part of the PUCCH reporting type, a PUCCH reporting mode, and a number of antenna ports.

12. The terminal of claim 7, wherein bits for the coded multiple CSI include a cyclic redundancy check (CRC) mask as an indicator indicating the number of actual CSI bits per the plurality of cells.

* * * * *